United States Patent Office 3,580,857
Patented May 25, 1971

3,580,857
STABLE LIQUID DICARBOXYLIC ACID ANHYDRIDE COMPOSITION
Chao-Shing Cheng, Williamsville, and Francis E. Evans, Hamburg, N.Y., assignors to Allied Chemical Corporation, New York, N.Y.
No Drawing. Filed Feb. 8, 1968, Ser. No. 703,866
Int. Cl. C07c 63/00; C08f 45/60
U.S. Cl. 252—182                                    20 Claims

ABSTRACT OF THE DISCLOSURE

Production of stable liquid organic carboxylic anhydrides by adding to an unstable liquid anhydride a freeze-thaw stabilizing amount of an organic isocyanate or carbodimide; if desired, the resultant liquid anhydride may be purified by subjecting the same to distillation to recover, as distillate, a pure anhydride which may be stored for extended periods without deposition of solids.

---

Organic dicarboxylic anhydrides are widely used as curing agents for polyepoxides and glycidyl ethers of polyhydric phenols and polyhydric alcohols, otherwise known and hereafter referred to as "epoxy resins." The cured resins form strong products of relatively high molecular weight and are widely employed as structural plastics, adhesives, molding resins, films and the like because of their strength, chemical resistance and adhesive characteristics.

The dicarboxylic anhydrides, such as phthalic anhydride and hydrogenated derivatives thereof, e.g., tetrahydrophthalic anhydride and hexahydrophthalic anhydride and anhydride mixtures containing them, constitute effective curing or hardening agents for converting epoxy resins to resinous structures and other useful products. Such anhydrides melt well above ambient temperatures and consequently, in producing a uniformly cured resin, they must be heated and mixed in a molten state with the molten epoxy resin in order to provide intimate contact of the curing agent with the epoxy resin composition and thus to produce a uniformly cured resin. The necessity to employ elevated temperatures when mixing the anhydride curing agent with the reactive epoxy resin is a serious disadvantage in many applications because the "pot life" of the resin mixture is greatly shortened at elevated temperatures. This is a particular problem when large volumes of the resin are cured since it is difficult to mold or otherwise utilize such large volumes of resin before the resin sets to a hard and therefore unmanageable mass. Furthermore, the requirement of heating the curing agent and epoxy resin in order to be able to mix them together adds to the trouble and cost of the process.

Certain known dicarboxylic anhydride mixtures, for example, tetrahydrophthalic anhydride (which is a mixture of the Δ1-, Δ2-, Δ3-, Δ4-tetrahydrophthalic anhydride), and a mixture of 85 parts of hexahydrophthalic anhydried and 15 parts of tetrahydrophthalic anhydrides (by weight), remain liquid at room temperature for extended periods, due, probably, to super cooling, even though such compositions do not have true melting points below the normal room temperatures. However, such supercooled liquids eventually soldify, or at least deposit solids, and consequently one cannot be certain how long such super-cooled mixtures will remain liquid. Moreover, if these mixtures of curing agents are cooled to freezing temperature they will crystallize and the solid masses do not revert to the liquid state on warming to room temperature. In other words these compositions are not freeze-thaw resistant. This is particularly important since, in shipping and storage during the winter months, these supercooled liquid masses are often exposed to freezing temperatures, and below, which results in their solidification. On warming to room temperature, the mixtures do not liquify completely, but require heating to temperatures well above the melting point followed by careful cooling of the molten mass so as to avoid soldification of the metastable liquid phase. Another disadvantage of such supercooled liquid mixtures is that they require extreme caution in their prepartion since the presence of even a minute quantity of solid in such supercooled liquids may cause them to solidify.

It is therefore an object of this invention to provide stable homogeneous liquid dicarboxylic acid anhydride compositions which are freeze-thaw resistant.

Another object is to provide compositions comprising essentially a mixture of isomeric tetrahydrophthalic acid anhydrides which are stable liquids at room temperature and which when frozen will revert to their original homogeneous state upon being warmed to about 20° C.

A further object of this invention is to devise processes for preparing such stable homogeneous liquid compositions and for preparing purified anhydrides therefrom.

Other objects will be obvious from the following description of our invention.

In accordance with the present invention it has been discovered that liquid mixtures of dicarboxylic anhydrides which are stable, homogeneous liquids at ordinary temperatures (i.e., about 20° C.±10° C.); remain in homogeneous, liquid condition for extended periods (i.e., about one month or more); are freeze-thaw resistant (i.e., they revert to their original homogeneous, liquid condition when solidified by freezing and rewarmed to about 20° C.); and which are especially adapted for use as curing agents for epoxy resins, can be obtained by contacting the normally unstable liquid mixture of organic dicarboxylic anhydrides with a small but stabilizing amount of an organic isocyanate or carbodiimide. (By "normally unstable liquid mixture of dicarboxylic anhydrides" is meant an anhydride mixture which is liquid at ordinary temperature but which on being solidified by freezing does not revert to its homogeneous liquid condition on being rewarmed to about 20° C. Such "normally unstable anhydrides" also will, on standing for periods of less than about one month, deposit solids and thus become heterogeneous liquid compositions.) Thus it has been discovered that by incorporating a small amount of an organic isocyanate or carbodiimide into a polycarboxylic acid anhydride mixture said anhydride compositions may be converted from the normally unstable and heterogeneous compositions which are not freeze-thaw resistant to stable, homogeneous, liquid compositions which remain homogeneous and liquid for extended periods at ordinary temperatures and which after being exposed to temperatures at or below their solidification temperatures, revert to said homogeneous liquid form on being warmed to about 20° C. Desirably a liquid anhydride mixture thus contacted with organic isocyanate or carbodiimide is distilled to recover a liquid anhydride mixture substantially free of the isocyanate or carbodiimide. This liquid anhydride distillate is substantially as stable as the mixture before distillation.

In addition to being stable, the liquid anhydride compositions of the present invention are readily miscible with epoxy resins at or near ordinary temperatures, and hence, the incorporation of the stabilized composition is accomplished simply without the application of heat. After curing, the compositions of the present invention yield products having properties comparable in excellence to properties obtained when the same resins are cured with the same anhydrides to which the stabilizing agent(s) have not been added. The presence of small stabilizing amounts of the organic isocyanate or carbodiimide, or reaction products thereof which may be formed, do not adversely effect their ability to cure epoxy resins. As indicated above, the stabilized compositions may be incorporated in the epoxy resin at substantially room temperatures. This is not only a more convenient operation than addition of hot molten anhydrides but also results in a considerable extension of the working life of the reactive mixture of epoxy resin and anhydride curing composition, which are generally cured by the application of heat. After the addition of the stabilized anhydride to the epoxy resin, the mixture can be thoroughly blended at relatively low temperatures (i.e., temperatures at which reactions do not occur or occur so slowly as to be insignificant), and the blended mixture may be poured into molds of any size or complexity and thereafter, be cured to a hard mass by application of heat.

Various cyclic anhydrides, or mixtures of such, are useful as components of the compositions of the present invention and in the preparation of such novel compositions. As employed herein, the term "cyclic anhydride" denotes and includes dicarboxylic anhydrides that are derived from a single molecule of a dicarboxylic acid, so that the anhydride group forms at least one heterocyclic nucleus with the remainder of the carboxylic acid. They comprise anhydrides derived from aliphatic or cycloaliphatic polycarboxylic acids, as well as from aromatic or heterocyclic polycarboxylic acids having at least two vicinal carboxylic acid groups, and include those which are saturated and those which are unsaturated. They include anhydrides derived from polycarboxylic acids which contain two or more sets of vicinal carboxylic acid groups as well as those which contain but one set of such acid groups, and which may contain one or more isolated (i.e. not in vicinal relationship to another acid group) carboxylic acid groups. Examples of cyclic anhydrides which can be employed, alone or in admixture with other anhydrides, in the preparation of the stable liquid anhydride composition of our invention are aliphatic cyclic polybasic anhydrides such as maleic anhydride, succinic anhydride, dodecenyl succinic anhydride, chlorosuccinic anhydride, chloromaleic anhydride, dioctyl succinic anhydride, nonadecadienyl succinic anhydride, and the like; aromatic cyclic polybasic anhydrides such as trimellitic anhydride, phthalic anhydride and the like; cycloaliphatic cyclic polybasic polycarboxylic anhydrides such as tetrahydrophthalic anhydride, hexahydrophthalic anhydrade, dihydrophthalic anhydride, as well as the anhydrides derived from such polycarboxylic acids as 6-ethyl-4-cyclohexene-1,2-dicarboxylic acid,
3,6-dimethyl-4-cyclohexene-1,2-dicarboxylic acid,
6-butyl-3,5-cyclohexadine-1,2-dicarboxylic acid,
3-methyl-1,2,3,6-tetrahydrophthalic acid,
bicyclo[2,2,1]hept-5-ene-2,3-dicarboxylic acid,
methylbicyclo[2,2,1]]hept-5-ene-2,3-dicarboxylic acid and the like. In general, the anhydrides employable herein may contain from about 4 to 25 carbon atoms but preferably contain from about 4 to 17 carbon atoms.

Where mixtures of two or more of the above or equivalent anhydrides are employed, the proportions prescribed by the prior art for producing an anhydride mixture which is liquid at room temperature or lower are utilized. Such prior art is illustrated by U.S. Patents 3,245,916, 3,296,148, 3,078,235, 3,341,555 and copending U.S. application of C. S. Cheng and F. C. Boye, S.N. 637,090 filed May 9, 1967, now Patent No. 3, 487,092.

Anhydrides especially preferred in the practice of this invention are cyclic anhydrides of polycarboxylic acids such as the isomeric tetrahydrophthalic anhydrides and mixtures thereof with phthalic, hexahydrophthalic and dodecenyl succinic anhydrides.

The stabilizing agents employed in the practice of this invention are organic isocyanates and carbodiimides. Preferably organic diisocyanates and carbodiimides are employed because of their general effectiveness, availability and modest cost.

Illustrative isocyanates useful in the practice of our invention are straight and branched chain aliphatic isocyanates such as n-butyl isocyanate, isopropyl isocyanate, n-stearyl isocyanate and 1,6-hexamethylene diisocyanate; cycloaliphatic isocyanates such as 1-methyl-2,4-diisocyanatocyclohexane and 4,4' - methylene - bis - (cyclohexylisocyanate); aromatic isocyanates such as m-phenylenediisocyanate, p-phenylenediisocyanate, 2,4-tolylene diisocyanate, 2,6-tolylene diisocyanate, phenylisocyanate, 4,4',4''-triisocyanatotriphenylmethane and 4,4' - methylene - bis- (phenylisocyanate), as well as polyisocyanates containing more than two isocyanato groups, e.g. those derived by phosgenation of aldehyde-arylamine condensation products as disclosed in U.S. Pat. 2,683,730.

Suitable carbodiimides useful in the practice of our invention include aliphatic, cycloaliphatic and aromatic carbodiimides such as dicyclohexyl carbodiimide, dibutyl carbodiimide, diphenyl carbodiimide, ditolyl carbodiimide, di(2,6-diethylphenyl) carbodiimide and polycarbodiimide containing residues derived from the distillation of organic diisocyanates.

Carbodiimides especially preferred in the practice of this invention are polycarbodiimide containing residues obtained as by-products, for example, from the distillation of organic diisocyanates.

The carbodiimides illustrated above are well known and are conventionally prepared by various procedures as illustrated by U.S. Pats. 2,941,966 and 2,853,473 and in the literature by Khorana, Chem. Revs. 53, p. 145 (1953) and Saunders et al., Polyurethanes: Chemistry and Technology, Part I, vol. XVI, pp. 93 to 97 (1962). Especially preferred is the distillation residue obtained from the distillation of crude tolylene diisocyanate derived from the phosgenation of toluene diamine.

The stabilizing agent is incorporated in the liquid polycarboxylic anhydride by simply adding the agent and agitating the mixture until it is homogeneous. The resultant composition as illustrated further below is stable to storage and is freeze-thaw resistant. In a particularly preferred embodiment of the invention, the anhydride stabilizer composition is distilled to recover pure anhydride which, even after removal of the stabilizing agent is stable to storage as illustrated herein below.

The mechanism of the stabilization process is not known or understood with certainty. Without limiting ourselves in any manner whatsoever, we believe that, at least in part, the isocyanates and likewise the carbodiimides, and/or their reaction products with carboxylic acids and/or water function to stabilize the liquid dicarboxylic anhydride by reacting with free acids and moisture which are present in the anhydride mass. (Water when present is objectionable since it hydrolyzes the anhydride moiety to a dicarboxylic acid moiety). The isocyanate reacts with the carboxylic acid to form an amide. This reaction product may be more soluble in the anhydride than the carboxylic acid and hence the stabilization of the anhydride to solids deposit is achieved. It is further surmised that by distillation of the treated anhydride and separation of the stabilizer or reaction product therefrom, the distillate (anhydride) is obtained free from carboxylic acid and moisture and thus exhibits stability properties not possessed by the untreated anhydride.

The amount of stabilizer added can be varied over a broad range. In general the amount added is relatively small, i.e. within the range of about 0.01 and about 5.0%, preferably within the range of about 0.1 to about 1.0%, by weight, based on the weight of the organic polycarboxylic acid anhydride to be treated. Inasmuch as in the preferred mode of carrying out the invention, the stabilized anhydride mixture is subjected to a distillation and thus is separated from the stabilizer or reaction product therefrom, the upper limit of the addition is not critical nor significant.

The following examples will illustrate the process of our invention. Parts and percentages are by weight and temperatures are given in degree centigrade.

EXAMPLES 1–17

A mixture of 12 parts of tetrahydrophthalic anhydride consisting of a mixture of $\Delta^1$, $\Delta^2$, $\Delta^3$, $\Delta^4$ isomers which is liquid at about 25° (present in the approximate percentage amounts: $\Delta^1$ isomer, 53.8%, $\Delta^2$ isomer, 1.1%, $\Delta^3$ isomer, 33.2% and $\Delta^4$ isomer, 11.8%) and 0.12 part of toluene diisocyanate (a commercial product being a mixture of approximately 80%, 2,4- and 20% 2,6-toluene diisocyanate) was agitated until a homogeneous solution resulted. This solution was placed in a freezer maintained at −20°, and held there about 16 hours. The mass was permitted to stand at ambient temperature (about 25°) for about 7 to 8 hours and then examined for solids. This completed one freeze-thaw cycle. No solids were found and the mass was returned to the freezer for another freeze-thaw cycle. At the completion of the third freeze-thaw cycle a small amount of solids remained in the otherwise clear liquid composition.

This experiment was repeated using in place of tolylene diisocyanate other chemicals to determine their effectiveness as stabilizing agents. The cycle was discontinued once precipitation began to occur. The results of these experiments are set out in the following Table I where, when they appear — indicates a clear liquid solution: −1 indicates a hazy solution; and + indicates precipitation began to occur.

TABLE I

| Experiment | Stabilizer | Amount, percent | Freeze-thaw cycle | | | | |
|---|---|---|---|---|---|---|---|
| | | | 1 | 2 | 3 | 4 | 5 |
| 1 | TDI [1] | 1 | − | − | + | | |
| 2 | Dimethyl formamide | 1 | + | − | | | |
| 3 | H$_{12}$MDI [2] | 1 | − | − | + | | |
| 4 | Dimethylsulfoxide | 0.5 | − | + | | | |
| 5 | Formamide | 0.5 | − | + | | | |
| 6 | TDI [1] | 0.5 | − | − | + | | |
| 7 | Hexamethylene diisocyanate | 1.0 | −1 | −1 | −1 | −1 | + |
| 8 | do | 0.5 | −1 | −1 | −1 | −1 | −1 |
| 9 | Diisocyanate-M [3] | 1.0 | −1 | −1 | −1 | −1 | −1 |
| 10 | do [3] | 0.5 | −1 | −1 | −1 | −1 | + |
| 11 | U.C. cedi X [4] | 1.0 | − | −1 | −1 | −1 | + |
| 12 | do [4] | 0.5 | − | −1 | −1 | −1 | − |
| 13 | α,α-Xylylene diisocyanate (70% m=; 30% p-isomer) | 1.0 | − | − | − | − | − |
| 14 | do | 0.5 | − | − | − | − | − |
| 15 | H$_6$TDI [5] | 11.0 | − | − | − | − | − |
| 16 | H$_6$TDI [5] | 0.5 | − | − | − | − | − |
| 17 | Cyclohexane-bis-(methylisocyanate) | 1.0 | − | − | −1 | −1 | + |

[1] Mixture of 2,4- and 2,6-toluene diisocyanate.
[2] 4,4′-methylene-bis-(cyclohexylisocyanate).
[3] Ethyl 2,6-diisocyanato-hexanoate.
[4] Bis(β-isocyanatoethyl)-Δ$^4$-tetrahydrophthalate.
[5] 2,4- and 2,6-diisocyanato-methylcyclohexane.

As can be seen from the foregoing table, all of the stabilizing agents of the invention were effective to impart freeze-thaw resistance for at least three cycles and in most instances for at least five cycles and other agents were not as effective since precipitation started either after the first or second cycle.

The effectiveness of the organic diisocyanates and organic carbodiimides as stabilizers for liquid dicarboxylic anhydrides is demonstrated by the following experiments wherein the presence or absence of free carboxylic acid is taken as a measure of stability.

In carrying out these tests, the crude or unstable liquid tetrahydrophthalic anhydried, to which the agent being evaluated had been added, was agitated and heated at about 110° for one half to one hour. The mixture was distilled, in vacuo, and the distilled product was tested for free carboxylic acid as follows:

Five milliliters of the liquid anhydride, to which five drops of di-o-tolylcarbodiimide were added, was agitated and heated to between 100° and 105°. The mass was cooled to ambient temperature (about 25°) and diluted with ten milliliters of dry toluene. Two drops of untreated anhydride (containing solids) were added to serve as seed. The mass was well stoppered and then cooled in an ice-salt mixture for ½ hour. The cooled mixture was warmed to ambient temperature and examined for the presence or absence of solids. The results of such an evaluation using different stabilizing agents are shown in the following table.

TABLE II

| Additive | Percent used | Result |
|---|---|---|
| None | | Heavy solids. |
| Di-o-tolylcarbodiimide | 0.25 | Substantially no solids. |
| Do | 0.5 | Do. |
| Residue from TDI distillation [1] | 1.0 | Do. |
| Diisocyanate-M | 0.5 | Do. |
| Hexahydro TDI | 0.5 | Do. |
| H$_{12}$MDI | 0.5 | Do. |
| α,α-Xylylene diisocyanate | 0.5 | Do. |
| n-Butyl isocyanate | 0.5 | Do. |

[1] Containing a maximum of 50% of a polycarbodiimide.

The various preferred embodiments of this invention have been set forth in the foregoing specification and it is apparent that numerous modifications in these embodiments may be made without departing from the scope and spirit of the appended claims.

We claim:

1. A stable freeze-thaw resistant homogeneous composition of matter which is a liquid at a temperature of about 10 to 30° C. consisting essentially of a liquid mixture of at least two organic cyclic polycarboxylic anhydrides containing 4 to 25 carbon atoms which mixture is normally heterogeneous at least after being subjected to a freeze-thaw cycle and a small stabilizing amount of an agent selected from the group consisting of an organic isocyanate selected from straight chain aliphatic, branched chain aliphatic, cycloaliphatic and aromatic monoisocyanates and polyisocyanates and an organic carbodiimide selected from aliphatic, cycloaliphatic and aromatic monocarbodiimides and polycarbodiimides.

2. A composition as defined in claim 1 wherein said stabilizing agent is present in an amount from about 0.01 to about 5.0 percent by weight of said mixture of anhydrides.

3. A composition as claimed in claim 1 wherein said stabilizing agent is an organic isocyanate.

4. A composition as claimed in claim 3 wherein said organic isocyanate is toluene diisocyanate, α,α-xylylene diisocyanate, or diisocyanatomethylcyclohexane.

5. A composition as claimed in claim 1 wherein said stabilizing agent is an organic carbodiimide.

6. A composition as claimed in claim 5 wherein said carbodiimide is a distillation residue obtained from the distillation of crude toluene diisocyanate derived from the phosgenation of toluene diamine.

7. A composition as defined in claim 1 wherein said mixture of polycarboxylic anhydrides is a mixture of tetrahydrophthalic anhydrides or a mixture thereof with phthalic anhydride, hexahydrophthalic anydride or dodecenylsuccinic anhydride.

8. A composition as defined in claim 7 wherein said stabilizing agent is present in an amount from about 0.01 to about 5 percent by weight of said mixture of anhydrides.

9. A process for the preparation of a stable freeze-thaw resistant homogeneous liquid organic polycarboxylic anhydride mixture composition which comprises incorporating in a liquid mixture of at least two cyclic polycarboxylic anhydrides containing 4 to 25 carbon atoms which mixture is normally heterogeneous at least after being subjected to a freeze-thaw cycle, from about 0.01 to about 5.0 percent, based on said anhydride mixture of a stabilizing agent selected from the group consisting of an organic isocyanate selected from straight chain aliphatic, branched chain aliphatic, cycloaliphatic and aromatic monoisocyanates and polyisocyanates and an organic carbodiimide selected from aliphatic, cycloaliphatic and aromatic monocarbodiimides and polycarbodiimides.

10. A process as defined in claim 9 wherein the stabilizing agent is an organic isocyanate.

11. A process as defined in claim 10 wherein the stabilizing agent is toluene diisocyanate, α,α-xylylene diisocyanate, or diisocyanatomethylcyclohexane.

12. A process as defined in claim 9 wherein the stabilizing agent is an organic carbodiimide.

13. A process as defined in claim 12 wherein the stabilizing agent is a distillation residue obtained from the distillation of crude tolylene diisocyanate derived from the phosgenation of toluene diamine.

14. A process as defined in claim 9 wherein said mixture of polycarboxylic anhydrides is a mixture of tetrahydrophthalic anhydrides or a mixture thereof with phthalic anhydride, hexahydrophthalic anhydride or dodecenylsuccinic anhydride.

15. A process for purification of a liquid polycarboxylic anhydride mixture to obtain a homogeneous liquid anhydride mixture which is stable against solid deposition on storage which comprises (1) forming a homogeneous mixture of a liquid mixture of at least two cyclic polycarboxylic anhydrides containing 4 to 25 carbon atoms which anhydride mixture is normally heterogeneous at least after being subjected to a freeze-thaw cycle with from about 0.01 to about 5.0 percent by weight of said anhydrides of an agent selected from the group consisting of an organic isocyanate selected from straight chain aliphatic, branched chain aliphatic, cycloaliphatic and aromatic monoisocyanates and polyisocyanates and an organic carbodiimide selected from aliphatic, cycloaliphatic and aromatic monocarbodiimides and polycarbodiimides and (2) distilling said mixture to recover as a distillate fraction a liquid homogeneous storage-stable polycarboxylic anhydride mixture which is substantially free of said agent.

16. A process as defined in claim 15 wherein said stabilizing agent is an organic isocyanate.

17. A storage stable liquid polycarboxylic anhydride mixture obtained as distillate fraction in accordance with the process of claim 15.

18. A process as defined in claim 15 wherein said stabilizing agent is an organic carbodiimide.

19. A process as defined in claim 18 wherein said carbodiimide is the distillation residue obtained from the distillation of crude tolylene diisocyanate derived from the phosgenation of toluene diamine.

20. A process as defined in claim 15 wherein said anhydride is a mixture of tetrahydrophthalic anhydrides or a mixture of at least one tetrahydrophthalic anhydride with phthalic anhydride, hexahydrophthalic anhydride or dodecenylsuccinic anhydride.

References Cited

UNITED STATES PATENTS

| | | | |
|---|---|---|---|
| 3,078,235 | 2/1963 | Bowman et al. | 252—182 |
| 3,245,916 | 4/1966 | Woskow | 252—182 |
| 3,247,125 | 4/1966 | Woskow | 252—182 |
| 3,193,522 | 6/1965 | Neumann et al. | 252—405 |
| 3,341,555 | 10/1967 | Wooster et al. | 260—346.3 |
| 3,470,214 | 10/1969 | Young | 260—346.3 |

OTHER REFERENCES

The Condensed Chemical Dictionary, Reinhold, New York, 1961, p. 387.

RICHARD D. LOVERING, Primary Examiner

I. GLUCK, Assistant Examiner.

U.S. Cl. X.R.

252—401, 405; 260—2, 18, 47, 346.3